(12) United States Patent
Owatari et al.

(10) Patent No.: US 11,142,093 B2
(45) Date of Patent: Oct. 12, 2021

(54) FUEL CELL VEHICLE AND METHOD FOR CONTROLLING THE SAME

(71) Applicant: TOYOTA JIDOSHA KABUSHIKI KAISHA, Toyota (JP)

(72) Inventors: Shinya Owatari, Anjyo (JP); Yutaka Tano, Toyota (JP); Osamu Yumita, Seto (JP); Takahiro Umehara, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 5 days.

(21) Appl. No.: 16/718,417

(22) Filed: Dec. 18, 2019

(65) Prior Publication Data

US 2020/0215932 A1 Jul. 9, 2020

(30) Foreign Application Priority Data

Jan. 8, 2019 (JP) .............................. JP2019-001223

(51) Int. Cl.
*B60L 58/30* (2019.01)
*B60L 50/51* (2019.01)
(Continued)

(52) U.S. Cl.
CPC ............... *B60L 58/30* (2019.02); *B60L 50/51* (2019.02); *B60L 50/75* (2019.02);
(Continued)

(58) Field of Classification Search
CPC .... B60L 50/75; B60L 3/0053; B60L 2210/40; B60L 58/30; B60L 3/0038; B60L 50/70;
(Continued)

(56) References Cited

U.S. PATENT DOCUMENTS

2007/0217243 A1* 9/2007 Yamamoto ............ H02M 5/293
363/160
2010/0207598 A1* 8/2010 Hamatani .......... H05K 7/20945
323/351

(Continued)

FOREIGN PATENT DOCUMENTS

| JP | H10-253682 A | 9/1998 |
| JP | 2008-079447 | 4/2008 |
| JP | 2013-125613 | 6/2013 |
| JP | 2017-077070 | 4/2017 |
| JP | 2017-153241 | 8/2017 |

*Primary Examiner* — Adi Amrany
*Assistant Examiner* — Esayas G Yeshaw
(74) *Attorney, Agent, or Firm* — Finnegan, Henderson, Farabow, Garrett & Dunner, LLP

(57) ABSTRACT

A fuel cell vehicle according to the present disclosure includes: a fuel cell; a multiphase converter configured to control an output current of the fuel cell; a current sensor provided in each phase of the multiphase converter; an electric load configured to receive power supplied from the fuel cell; and a control unit. The control unit performs, when it detects an excess or a deficiency of electric energy of the electric load, replacement of phases driven by the multiphase converter while the output current of the fuel cell is kept constant, and determines, when the excess or the deficiency of the electric energy of the electric load is eliminated after the replacement of the phases, that an offset failure has occurred in the current sensor provided in the phase that has been driven before the replacement.

5 Claims, 3 Drawing Sheets

(51) Int. Cl.
*B60L 50/75* (2019.01)
*H01M 8/04537* (2016.01)
*H01M 8/04664* (2016.01)
*H01M 8/04858* (2016.01)

(52) U.S. Cl.
CPC ... *H01M 8/04582* (2013.01); *H01M 8/04686* (2013.01); *H01M 8/04902* (2013.01); *B60L 2210/40* (2013.01); *H01M 2250/20* (2013.01)

(58) Field of Classification Search
CPC .... B60L 50/51; Y02E 60/50; H01M 2250/20; H01M 8/04902; H01M 8/04582; H01M 8/04686; H02M 2003/1586; H02M 2001/0009; Y02T 90/40; Y02T 90/14; Y02T 10/70; Y02T 10/7072
See application file for complete search history.

(56) References Cited

U.S. PATENT DOCUMENTS

| | | | | |
|---|---|---|---|---|
| 2015/0085553 | A1* | 3/2015 | Kinomura | H02M 5/293 363/163 |
| 2016/0114788 | A1* | 4/2016 | Kamatani | B60W 10/08 701/22 |
| 2016/0155278 | A1* | 6/2016 | Nozawa | G01K 3/10 701/22 |
| 2016/0254212 | A1* | 9/2016 | Kusaka | H01L 23/3735 361/699 |
| 2016/0276935 | A1* | 9/2016 | Arai | B60L 3/0023 |
| 2017/0244337 | A1* | 8/2017 | Kitamoto | B60R 16/033 |
| 2018/0287500 | A1* | 10/2018 | Tsutsui | H02M 3/1584 |

* cited by examiner

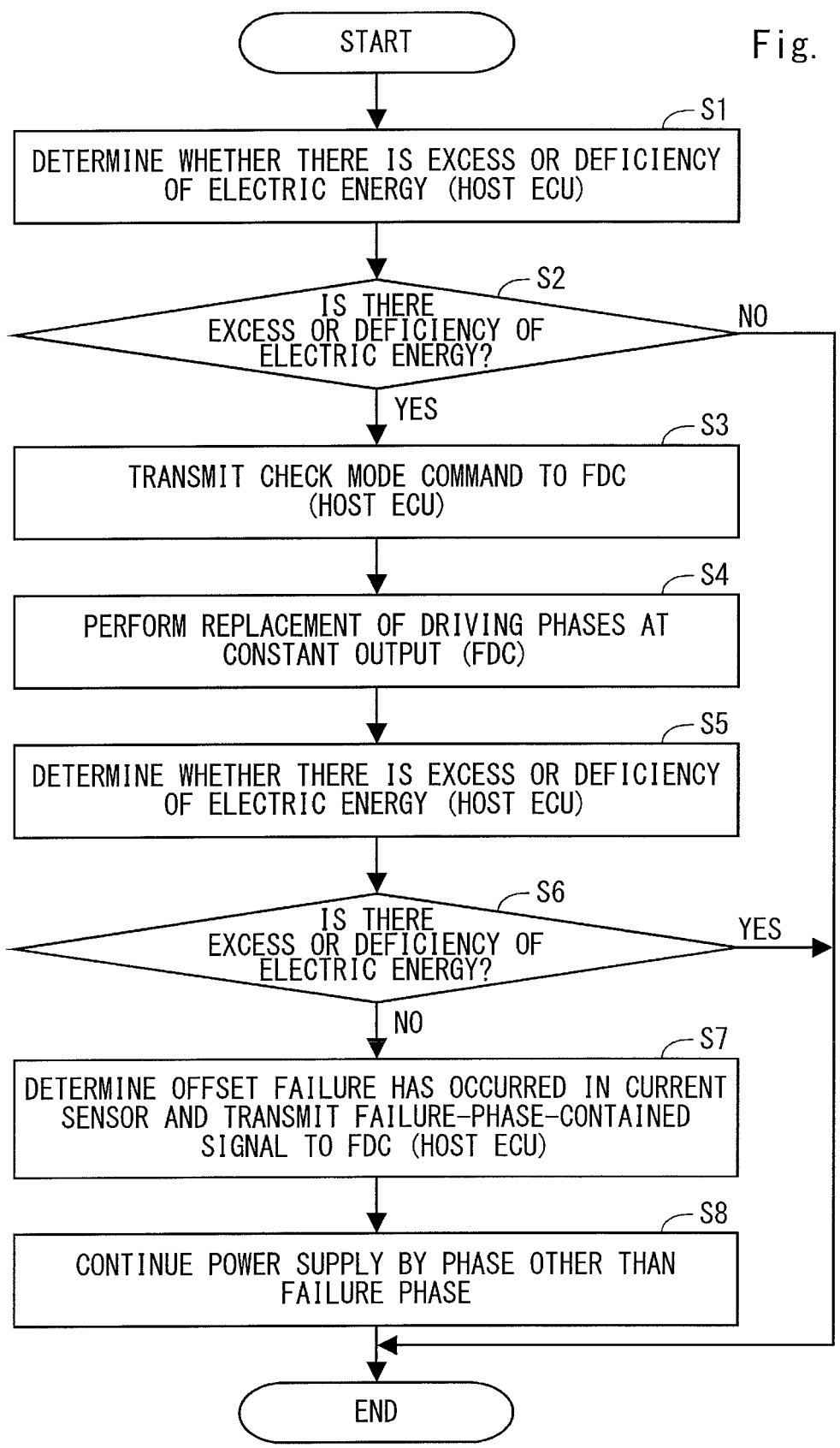

FUEL CELL VEHICLE AND METHOD FOR CONTROLLING THE SAME

CROSS REFERENCE TO RELATED APPLICATIONS

This application is based upon and claims the benefit of priority from Japanese patent application No. 2019-001223, filed on Jan. 8, 2019, the disclosure of which is incorporated herein in its entirety by reference.

BACKGROUND

The present disclosure relates to a fuel cell vehicle with a fuel cell (FC) mounted thereon and a method for controlling the same.

In a fuel cell vehicle with a fuel cell mounted thereon, a converter referred to as a Fuel cell Direct current Converter (FDC) is provided in order to control an output current (FC current) of the fuel cell. An FDC is implemented, for example, by a multiphase converter in which a plurality of converters are connected in parallel to one another. At a high load, a multiphase converter can reduce the load per phase compared to a single-phase converter, whereby the size thereof can be reduced. Japanese Unexamined Patent Application Publication No. 2017-153241 discloses an example of this multiphase converter.

In the technique disclosed in Japanese Unexamined Patent Application Publication No. 2017-153241, a plurality of conversion units (converters) are connected in parallel to one another and thereby configure a multiphase converter. Further, switching control of the number of drive phases of the multiphase converter and equalization (balance) control of the currents of the respective phases are performed by using a detection value of a first current sensor that detects the current flowing between a fuel cell and a multiphase converter, and a detection value of a second current sensor that detects the current flowing through the conversion unit of each phase of the multiphase converter. Further, the presence or absence of the current sensor, which is used for the aforementioned control, and of the aforementioned control are determined in accordance with the states of failures in the first and the second current sensors. Note that examples of failures of the current sensor disclosed in Japanese Unexamined Patent Application Publication No. 2017-153241 include a failure in which the output value is fixed to an upper value, a failure in which the output value is fixed to an intermediate value, and a failure in which the output value is fixed to a lower value.

SUMMARY

It should be noted that a current sensor may causes a failure referred to as an offset failure in which a sensor-detected current value detected by the current sensor and a current value (actual current value) of the current (actual current) that actually flows are deviated from each other.

When the multiphase converter is continuously controlled in the same manner as that in a normal operation in a state in which an offset failure has occurred in the current sensor, a power shortage of an electric load such as a motor may continue if the actual current value is lower than the sensor-detected current value. Further, on the other hand, if the actual current value is higher than the sensor-detected current value, power supply to the electric load may be excessive and then the control may be stopped.

Therefore, it is necessary to detect an offset failure of the current sensor, and to prevent the control from being stopped due to a power shortage of the electric load and excessive power supply to the electric load. However, in the technique disclosed in Japanese Unexamined Patent Application Publication No. 2017-153241, the failure targets of the current sensor only include a failure in which the output value is fixed to an upper value, a failure in which the output value is fixed to an intermediate value, and a failure in which the output value is fixed to a lower value. This causes a problem that an offset failure of the current sensor cannot be detected.

The present disclosure has been made in view of the aforementioned problems and provides a fuel cell vehicle capable of detecting an offset failure of a current sensor provided in a multiphase converter, and a method for controlling the same.

A first exemplary aspect is a fuel cell vehicle including:
a fuel cell;
a multiphase converter configured to control an output current of the fuel cell;
a current sensor provided in each phase of the multiphase converter;
an electric load configured to receive power supplied from the fuel cell; and
a control unit, in which
the control unit:
performs, when it detects an excess or a deficiency of electric energy of the electric load, replacement of phases driven by the multiphase converter while the output current of the fuel cell is kept constant; and
determines, when the excess or the deficiency of the electric energy of the electric load is eliminated after the replacement of the phases, that an offset failure has occurred in the current sensor provided in the phase that has been driven before the replacement.

Another exemplary aspect is a method for controlling a fuel cell vehicle including: a fuel cell; a multiphase converter configured to control an output current of the fuel cell; a current sensor provided in each phase of the multiphase converter; and an electric load configured to receive power supplied from the fuel cell, the method including:
performing, when an excess or a deficiency of electric energy of the electric load is detected, replacement of phases driven by the multiphase converter while the output current of the fuel cell is kept constant, and
determining, when the excess or the deficiency of the electric energy of the electric load is eliminated after the replacement of the phases, that an offset failure has occurred in the current sensor provided in the phase that has been driven before the replacement.

According to the above-described exemplary aspects of the present disclosure, it is possible to provide a fuel cell vehicle capable of detecting an offset failure of a current sensor provided in a multiphase converter, and a method for controlling the same.

The above and other objects, features and advantages of the present disclosure will become more fully understood from the detailed description given hereinbelow and the accompanying drawings which are given by way of illustration only, and thus are not to be considered as limiting the present disclosure.

BRIEF DESCRIPTION OF DRAWINGS

FIG. 3 is a flowchart showing an example of a method for controlling the fuel cell vehicle according to the embodiment.

DESCRIPTION OF EMBODIMENTS

Embodiments of the present disclosure are described hereinafter with reference to the drawings. Note that the same or corresponding elements are denoted by the same symbols throughout the drawings explained below, and duplicated explanations are omitted as necessary.

First, a configuration of a fuel cell vehicle 10 according to this embodiment is described with reference to FIG. 1.

Figure 1:
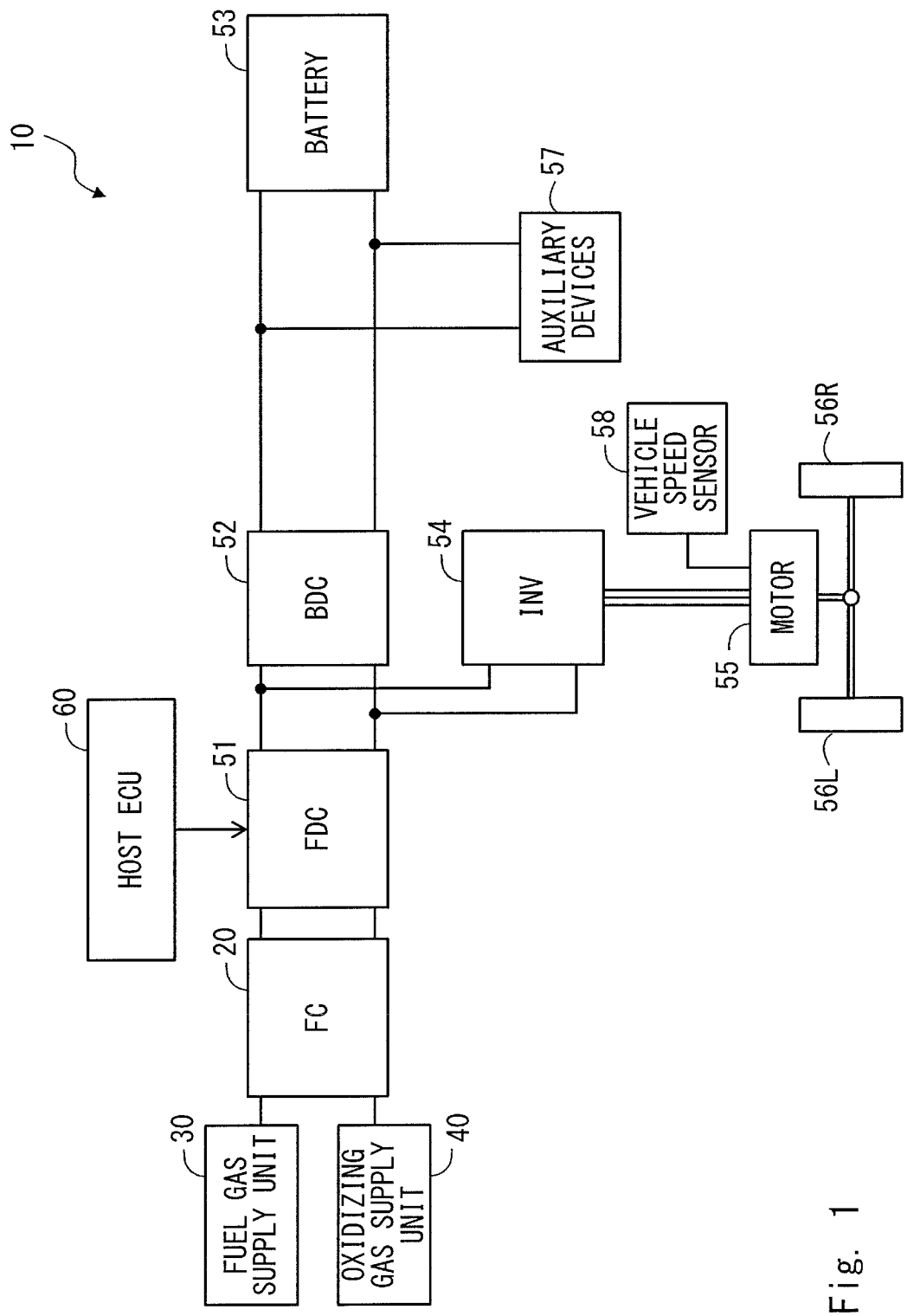
FIG. 1 is a diagram showing a configuration example of a fuel cell vehicle according to an embodiment.

As shown in FIG. 1, the fuel cell vehicle 10 according to this embodiment includes an FC 20, a fuel gas supply unit 30, an oxidizing gas supply unit 40, an FDC 51, a Battery Direct Current Converter (BDC) 52, a battery 53, an inverter 54, a traction motor 55, wheels 56L and 56R, auxiliary devices 57, a vehicle speed sensor 58, and a host Electronic Control Unit (ECU) 60. Note that in FIG. 1, only the components relevant to the present disclosure are selectively shown from among the components of the fuel cell vehicle 10, and other components thereof are omitted for the sake of brevity. Further, the host ECU 60 controls each component in the fuel cell vehicle 10 as described later, but regarding the connection lines between the host ECU 60 and the respective components, only the connection line between the host ECU 60 and the FDC 51 is shown and the other connection lines are omitted. Further, as described later, the FDC 51 includes an FDC_ECU 710, and the host ECU 60 and the FDC_ECU 710 configure a control unit.

The FC 20 is, for example, a polymer electrolyte fuel cell, and has a stack structure in which a plurality of unit cells including a Membrane Electrode Assembly (MEA) are stacked in series. The FC 20 generates necessary power by reacting hydrogen gas supplied as fuel gas to the anode side with air (oxygen) supplied as oxidant gas to the cathode side.

The fuel gas supply unit 30 supplies hydrogen gas as fuel gas to the anode side of the FC 20 based on a command from the host ECU 60. The fuel gas supply unit 30 includes, for example, a hydrogen tank, various valves, and an injector.

The oxidizing gas supply unit 40 supplies air as an oxidizing gas to the cathode side of the FC 20 based on a command from the host ECU 60. The oxidizing gas supply unit 40 includes, for example, an air compressor, and various valves.

The FDC 51 is a converter for the FC 20, and controls an output current of the FC 20 based on a command from the host ECU 60. Note that the FDC 51 is implemented by a multiphase converter, and the detailed configuration of the FDC 51 will be described later with reference to FIG. 2.

The BDC 52 is a converter for the battery 53, and switches the state of the battery 53 to a charged state or a discharged state based on a command from the host ECU 60. Note that the circuit configuration of the BDC 52 may be the same as that of the FDC 51, but is not limited thereto.

The battery 53 is a storage battery that stores power energy generated by the FC 20 and repeats charging and discharging. Examples of the battery 53 include a lithium ion battery, a lead storage battery, a nickel cadmium battery, and a nickel hydrogen battery.

The inverter 54 is an inverter that converts the direct current power supplied from the FC 20 or the battery 53 into alternating current power and supplies the converted alternating current power to the traction motor 55 based on a command from the host ECU 60.

The traction motor 55 is a motor that drives the wheels 56L and 56R by receiving the alternating current power supplied from the inverter 54 based on a command from the host ECU 60. The traction motor 55 is, for example, a synchronous motor including a three-phase coil. Note that when regenerative power is generated in the traction motor 55 by the rotation of the wheels 56L and 56R, the regenerative electric power is converted into direct current power by the inverter 54 and charged into the battery 53 through the BDC 52 based on a command from the host ECU 60.

The term "auxiliary devices 57" is a generic term for each motor (e.g., power source such as pumps) disposed in each unit in the fuel cell vehicle 10, inverters for driving these motors, and even various in-vehicle auxiliary devices. The auxiliary devices 57 are also controlled by the host ECU 60.

The vehicle speed sensor 58 is a sensor that detects a vehicle speed of the fuel cell vehicle 10 based on a rotation speed of the traction motor 55. Note that the vehicle speed detected by the vehicle speed sensor 58 is transmitted to the host ECU 60 and used for drive control of the fuel cell vehicle 10.

The host ECU 60 is an ECU that controls each component in the fuel cell vehicle 10 as described above. However, the feature of the present disclosure lies in that the FDC 51 is controlled in order to detect an offset failure of current sensors (e.g., reactor current sensors 730-1 to 730-4 described later) provided in each phase of the FDC 51 which is a multiphase converter. Accordingly, in the following description, only the control of the FDC 51 will be described from among the controls by the host ECU 60, and the description of the other controls will be omitted.

Figure 2:
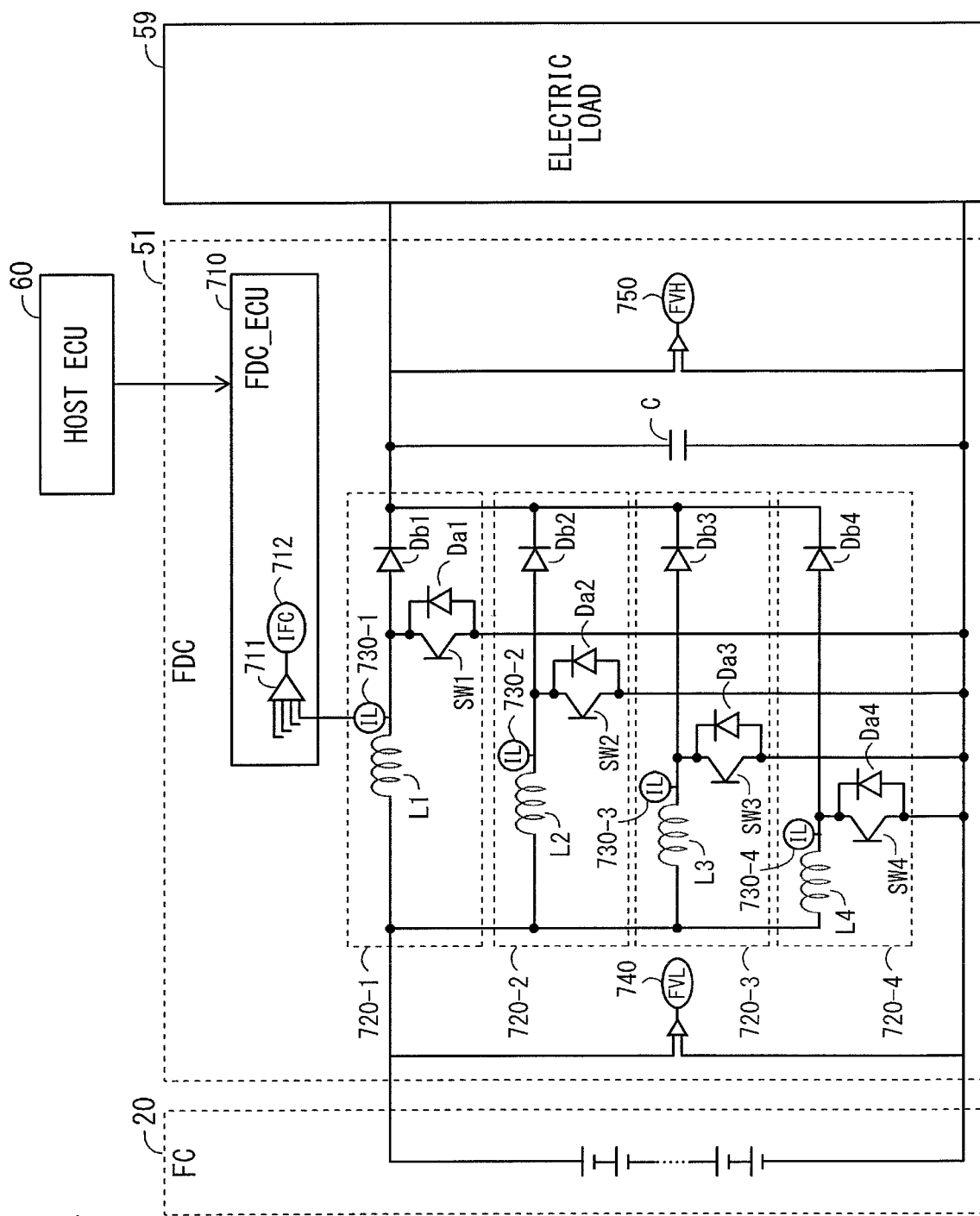
FIG. 2 is a diagram showing a configuration example of an FDC according to the embodiment.

Next, a configuration of the FDC 51 according to this embodiment is described with reference to FIG. 2. Note that FIG. 2 shows an example of a case where the FDC 51 is a four-phase converter in which four converters are connected in parallel to one another. However, the number of phases of the FDC 51 is not limited to four.

As shown in FIG. 2, the FDC 51 according to this embodiment includes the FDC_ECU 710, four converters 720-1 to 720-4, voltage sensors 740 and 750, and a capacitor C. Note that in FIG. 2, an electric load 59 is a load that includes the traction motor 55, the auxiliary devices 57, and the like shown in FIG. 1 and receives power supply from the FC 20.

The converters 720-1 to 720-4 are connected in parallel to one another. The converter 720-1 includes a reactor L1, a switching element SW1, diodes Da1 and Db1, and a reactor current sensor 730-1. The converter 720-2 includes a reactor L2, a switching element SW2, diodes Da2 and Db2, and a reactor current sensor 730-2. The converter 720-3 includes a reactor L3, a switching element SW3, diodes Da3 and Db3, and a reactor current sensor 730-3. The converter 720-4 includes a reactor L4, a switching element SW4, diodes Da4 and Db4, and a reactor current sensor 730-4. Note that when the converters 720-1 to 720-4 are not specified, they will be appropriately described hereinafter as the converter 720. Similarly, the reactor current sensors 730-1 to 730-4 will be appropriately described as the reactor current sensor 730.

As described above, the converters 720-1 to 720-4 have the same configurations as one another. Therefore, in the following description, only the configuration of the converter 720-1 is used as an example.

In the converter 720-1, one end of the reactor L1 is connected to an input terminal of the FDC 51 on the positive electrode side. In the diode Db1, an anode terminal thereof is connected to the other end of the reactor L1, and a cathode terminal thereof is connected to an output terminal of the FDC 51 on the positive electrode side. In the switching element SW1, one end thereof is connected between the reactor L1 and the diode Db1, and the other end thereof is connected to an input terminal and an output terminal of the FDC 51 on the negative electrode side. Further, the diode Da1 is connected in parallel to the switching element SW1. The reactor L1 repeats accumulation and discharge of power by turning on or off the switching element SW1. The power released from the reactor L1 is supplied to the electric load 59 through the diode Db1. The reactor current sensor 730-1 is a current sensor that is connected to an output stage (the other end) of the reactor L1 and detects a value of the current flowing through the reactor L1.

The capacitor C is connected in parallel to the electric load 59, which is, connected to each of the output terminals of the FDC 51 on the positive and negative electrode sides, and smooths an output voltage of the FDC 51.

The voltage sensor 740 detects a voltage of the FDC 51 on the input side, and the voltage sensor 750 detects a voltage of the FDC 51 on the output side.

The FDC_ECU 710 includes an adder circuit 711 that adds the current values detected by the reactor current sensors 730-1 to 730-4 of the respective four converters 720-1 to 720-4, and an FC current sensor 712 that detects a result of the addition by the adder circuit 711 as an output current (FC current) of the FC 20.

The FDC_ECU 710 performs any of a one-phase drive for driving one of the four converters 720-1 to 720-4, a two-phase drive for driving two of them, a three-phase drive for driving three of them, and a four-phase drive for driving four of them based on a command from the host ECU 60. When the FDC_ECU 710 drives n (n is an integer of 2 or greater and 4 or less) converters 720, the FDC_ECU 710 shifts the phases of the respective converters 720 by 360 degrees/n and then drives the converters.

Further, when the FDC_ECU 710 drives the converter 720, the FDC_ECU 710 performs control (current control) so that the current value of the output current from the FC 20, based on a current command value from the host ECU 60, becomes constant (the current command value).

Note that in this embodiment, the host ECU 60 and the FDC_ECU 710 perform, as characteristic operations of this embodiment other than the aforementioned operation, an operation of detecting an offset failure of the reactor current sensors 730-1 to 730-4, and an operation of driving a phase other than the phase in which the offset failure has occurred in the reactor current sensor 730 and continuing power supply to the electric load 59 when an offset failure of any of the reactor current sensors 730-1 to 730-4 is detected.

Next, the aforementioned operation performed by the host ECU 60 and the FDC_ECU 710 is described below with reference to FIG. 3. Note that the flows shown in FIG. 3 are flows performed during normal operation, for example, on a regular basis.

As shown in FIG. 3, the host ECU 60 determines whether there is an excess or a deficiency of electric energy of the electric load 59 during a normal operation (Step S1). For example, the host ECU 60 determines whether there is an excess or a deficiency of electric energy of the electric load 59 based on how much a State Of Charge (SOC) of the battery 53 is reduced (e.g., a ratio of reduction). If an offset failure has occurred in the reactor current sensor 730 of the phase currently being driven among the reactor current sensors 730-1 to 730-4 and then the actual current value is lower than the sensor detection current value detected by that reactor current sensor 730, the output current of the FC 20 is lower than the output current recognized by the host ECU 60. In this case, due to insufficient power supplied to the traction motor 55, power is also supplied from the battery 53 to the traction motor 55, and thus the SOC of the battery 53 is reduced. Therefore, by referring to how much the SOC of the battery 53 is reduced, it is possible to determine whether there is an excess or a deficiency of electric energy of the electric load 59.

When an excess or a deficiency of electric energy of the electric load 59 is not detected (NO in Step S2), the host ECU 60 ends the processing of this flow.

On the other hand, when an excess or a deficiency of electric energy of the electric load 59 is detected (YES in Step S2), the host ECU 60 transmits, to the FDC_ECU 710, a check mode command for shifting to a check mode for checking whether an offset failure has occurred in the reactor current sensor 730 provided in the phase currently being driven (Step S3).

Upon receiving the check mode command from the host ECU 60, the FDC_ECU 710 shifts to the check mode, and performs replacement of phases (i.e., replacement of a phase that is currently being driven with a phase that is not currently being driven) driven by the FDC 51 (Step S4). At this time, the FDC_ECU 710 controls the output current of the FC 20 so that it is constant (the current command value from the host ECU 60) before and after the replacement of the phases.

Next, the host ECU 60 determines again whether there is an excess or a deficiency of electric energy of the electric load 59 in a state in which the FDC_ECU 710 has performed the replacement of the phases (Step S5). This determination method may be the same as that in Step S1.

When an excess or a deficiency of electric energy of the electric load 59 is detected even after the replacement of the phases driven by the FDC 51 (YES in Step S6), the host ECU 60 can determine that the excess or the deficiency of electric energy has occurred due to another cause since an offset failure has not occurred in any of the reactor current sensors 730 provided in the phases which have been driven before and after the replacement. Accordingly, the host ECU 60 ends the processing of this flow. Note that in this case, another flow may be started to determine the other cause of the excess or the deficiency of electric energy, the other flow however is not an essential matter of the present disclosure, and any flow may be used and the description thereof is thus omitted here.

On the other hand, when the excess or the deficiency of electric energy of the electric load 59 is eliminated by the replacement of the phases driven by the FDC 51 (No in Step S6), the host ECU 60 can determine that an offset failure has occurred in the reactor current sensor 730 provided in the phase that has been driven before the replacement. Accordingly, the host ECU 60 transmits, to the FDC_ECU 710, a failure-phase-contained signal indicating that an offset failure has occurred in the reactor current sensor 730 provided in the phase that has been driven before the replacement (Step S7).

Upon receiving a failure-phase-contained signal from the host ECU 60, the FDC_ECU 710 handles the phase that has been driven before the replacement as a phase in which an offset failure has occurred in the reactor current sensor 730 and prohibits use of the phase, and drives a phase other than the phase in which an offset failure has occurred in the reactor current sensor 730, and then continues power supply to the electric load 59 (Step S8).

Next, a replacement pattern of a phase during the check mode is described below. When the FDC 51 is, for example, a four-phase converter, the replacement patterns of the phase during the check mode include each pattern during one-phase driving to four-phase driving. For example, the replacement pattern during the one-phase driving is a pattern for replacing one phase that is currently being driven with one phase that is not currently being driven.

However, in order for the fuel cell vehicle 10 to continue a constant traveling, it is preferred that the FDC 51 be normally driven by two or more phases.

As the replacement pattern of the phase during the check mode, a replacement pattern for driving, when an offset failure has occurred in the reactor current sensor 730 while N (N is an integer of 2 or greater)-phase driving is performed, M (M is an integer of 2 or greater) phases other than the phase in which a failure has occurred is described below. Further, an example in which the FDC 51 is a four-phase converter including a phase A to a phase D is described here.

(1) During Two-Phase Driving

Pattern a1:

A pattern a1 is a pattern for replacing the two phases that are currently being driven with the two phases that are not currently being driven. A specific example of the pattern a1 is described below.

For example, it is assumed that an excess or a deficiency of electric energy is detected while the phases A and B are being driven.

In this case, the phases A and B are replaced with the phases C and D, and then the phases C and D are driven.

Consequently, if an excess or a deficiency of electric energy is detected again, it can be determined that an offset failure has not occurred in any of the reactor current sensors 730 provided in the phases A, B, C, and D.

Meanwhile, if an excess or a deficiency of electric energy is eliminated, it can be determined that an offset failure has occurred in the reactor current sensors 730 provided in either of the phases A and B. Therefore, power supply may be continued by a two-phase drive using the phases C and D other than phases A and B.

Pattern a2:

The pattern a2 is a pattern in which one of the two phases that are currently being driven is replaced with another phase, and then the remaining one is replaced with another phase. A specific example of the pattern a2 is described below.

For example, it is assumed that an excess or a deficiency of electric energy is detected while the phases A and B are being driven.

In this case, first, the phase A is replaced with the phase C or D (here, the phase C), and then the phases B and C are driven.

Next, the phase B is replaced with the phase A, and then the phases A and C are driven.

Consequently, if an excess or a deficiency of electric energy is detected again even while any of the combinations of the phases is being driven, it can be determined that no offset failure has occurred in any of the reactor current sensors 730 provided in the phases A, B and C.

Meanwhile, if an excess or a deficiency of electric energy is eliminated only while the phases A and C are being driven, it can be determined that an offset failure has occurred in the reactor current sensor 730 provided in the phase B. Therefore, power supply may be continued by either of a two-phase driving and a three-phase driving using the phases A, C, and D other than the phase B.

Further, if an excess or a deficiency of electric energy is eliminated only while the phases B and C are being driven, it can be determined that an offset failure has occurred in the reactor current sensor 730 provided in the phase A. Therefore, power supply may be continued by either of a two-phase driving and a three-phase driving using the phases B, C, and D other than the phase A.

As described above, when the FDC 51 is a four-phase converter, conceivable replacement patterns of the phases during two-phase driving include the above-described two patterns a1 and a2.

Among them, the pattern a1 is preferable as a pattern for reducing the number of times of the replacement of the phases and enabling at least two phases to be normally driven.

Meanwhile, the pattern a2 is preferable as a pattern for specifying the phase in which an offset failure has occurred in the reactor current sensor 730.

(2) During Three-Phase Driving

Pattern b1:

A pattern b1 is a pattern in which one of the three phases that are currently being driven is stopped to execute the pattern a1. A specific example of the pattern b1 is described below.

For example, it is assumed that an excess or a deficiency of electric energy is detected while the phases A, B, and C are being driven.

In this case, first, one of the phases A, B and C (here, the phase C) is stopped, and then the phases A and B are driven.

Next, the phases A and B are replaced with the phases C and D, and then the phases C and D are driven.

Consequently, if an excess or a deficiency of electric energy is detected again even while any of the combinations of the phases is being driven, it can be determined that no offset failure has occurred in any of the reactor current sensors 730 provided in the phases A, B, C, and D.

Meanwhile, if an excess or a deficiency of electric energy is eliminated only while the phases A and B are being driven, it can be determined that an offset failure has occurred in the reactor current sensor 730 provided in the phase C. Therefore, power supply may be continued by either of a two-phase driving and a three-phase driving using the phases A, B, and D other than the phase C.

Further, if an excess or a deficiency of electric energy is eliminated only while the phases C and D are being driven, it can be determined that an offset failure has occurred in the reactor current sensor 730 provided in either of the phases A and B. Therefore, power supply may be continued by a two-phase driving using the phases C and D other than the phases A and B.

Pattern b2:

A pattern b2 is a pattern in which the three phases that are currently being driven are replaced one by one in the same manner as that in the pattern a2. A specific example of the pattern b2 is described below.

For example, it is assumed that an excess or a deficiency of electric energy is detected while the phases A, B, and C are being driven.

In this case, first, the phases A, B, and C are replaced with the phases A, B, and D, and then the phases A, B, and D are driven.

Next, the phases A, B, and D are replaced with the phases A, C, and D, and then the phases A, C, and D are driven.

Next, the phases A, C, and D are replaced with the phases B, C, and D, and then the phases B, C, and D are driven.

Consequently, if an excess or a deficiency of electric energy is detected again even while any of the combinations of the phases is being driven, it can be determined that no offset failure has occurred in any of the reactor current sensors 730 provided in the phases A, B, C, and D.

Meanwhile, if an excess or a deficiency of electric energy is eliminated only while the phases B, C, and D are being driven, it can be determined that an offset failure has occurred in the reactor current sensor 730 provided in the phase A. Therefore, power supply may be continued by either of a two-phase driving and a three-phase driving using the phases B, C, and D other than the phase A.

Further, if an excess or a deficiency of electric energy is eliminated only while the phases A, C, and D are being driven, it can be determined that an offset failure has occurred in the reactor current sensor 730 provided in the phase B. Therefore, power supply may be continued by either of a two-phase driving and a three-phase driving using the phases A, C, and D other than the phase B.

Further, if an excess or a deficiency of electric energy is eliminated only while the phases A, B, and D are being driven, it can be determined that an offset failure has occurred in the reactor current sensor 730 provided in the phase C. Therefore, power supply may be continued by either of a two-phase driving and a three-phase driving using the phases A, B, and D other than the phase C.

As described above, when the FDC 51 is a four-phase converter, replacement patterns of the phases during three-phase driving include the above-described two patterns b1 and b2.

Among them, the pattern b1 is preferable as a pattern for reducing the number of times of the replacement of the phases and enabling at least two phases to be successfully driven.

Meanwhile, the pattern b2 is preferable as a pattern for specifying the phase in which an offset failure has occurred in the reactor current sensor 730.

(3) During Four-Phase Driving

Pattern c1:

A pattern c1 is a pattern in which two of the four phases that are currently being driven are stopped to execute the pattern a1. A specific example of the pattern c1 is described below.

For example, it is assumed that an excess or a deficiency of electric energy is detected while the phases A, B, C, and D are being driven.

In this case, first, two of the phases A, B, C, and D (here, the phases C and D) are stopped, and then the phases A and B are driven.

Next, the phases A and B are replaced with the phases C and D, and then the phases C and D are driven.

Consequently, if an excess or a deficiency of electric energy is detected again even while any of the combinations of the phases is being driven, it can be determined that no offset failure has occurred in any of the reactor current sensors 730 provided in the phases A, B, C, and D.

Meanwhile, if an excess or a deficiency of electric energy is eliminated only while the phases A and B are being driven, it can be determined that an offset failure has occurred in the reactor current sensor 730 provided in either of the phases C and D. Therefore, power supply may be continued by a two-phase drive using the phases A and B other than phases C and D.

Further, if an excess or a deficiency of electric energy is eliminated only while the phases C and D are being driven, it can be determined that an offset failure has occurred in the reactor current sensor 730 provided in either of the phases A and B. Therefore, power supply may be continued by a two-phase driving using the phases C and D other than the phases A and B.

Pattern c2:

A pattern c2 is a pattern in which one of the four phases that are currently being driven is stopped to execute the pattern b1. A specific example of the pattern c2 is described below.

For example, it is assumed that an excess or a deficiency of electric energy is detected while the phases A, B, C, and D are being driven.

In this case, first, one of the phases A, B, C and D (here, the phase D) is stopped, and then the phases A, B, and C are driven.

If an excess or a deficiency of electric energy is detected again even while the phases A, B and C are being driven, one of the phases A, B and C (here, the phase C) is stopped, and then the phases A and B are driven.

Next, the phases A and B are replaced with the phases C and D, and then the phases C and D are driven.

Consequently, if an excess or a deficiency of electric energy is detected again even while any of the combinations of the phases is being driven, it can be determined that no offset failure has occurred in any of the reactor current sensors 730 provided in the phases A, B, C, and D.

Meanwhile, if an excess or a deficiency of electric energy is eliminated only while the phases A and B are being driven, it can be determined that an offset failure has occurred in the reactor current sensor 730 provided in either of the phases C and D. Therefore, power supply may be continued by a two-phase drive using the phases A and B other than phases C and D.

Further, if an excess or a deficiency of electric energy is eliminated only while the phases C and D are being driven, it can be determined that an offset failure has occurred in the reactor current sensor 730 provided in either of the phases A and B. Therefore, power supply may be continued by a two-phase driving using the phases C and D other than the phases A and B.

Pattern c3:

A pattern c3 is a pattern in which one of the four phases that are currently being driven is stopped to execute the pattern b2. A specific example of the pattern c3 is described below.

For example, it is assumed that an excess or a deficiency of electric energy is detected while the phases A, B, C, and D are being driven.

In this case, first, the phase D is stopped, and then the phases A, B, and C are driven.

Next, the phase C is stopped, and then the phases A, B, and D are driven.

Next, the phase B is stopped, and then the phases A, C, and D are driven.

Next, the phase A is stopped, and then the phases B, C, and D are driven.

Consequently, if an excess or a deficiency of electric energy is detected again even while any of the combinations of the phases is being driven, it can be determined that no offset failure has occurred in any of the reactor current sensors 730 provided in the phases A, B, C, and D.

Meanwhile, if an excess or a deficiency of electric energy is eliminated only while the phases A, B, and C are being driven, it can be determined that an offset failure has occurred in the reactor current sensor 730 provided in the phase D. Therefore, power supply may be continued by either of a two-phase driving and a three-phase driving using the phases A, B, and C other than the phase D.

Further, if an excess or a deficiency of electric energy is eliminated only while the phases A, B, and D are being driven, it can be determined that an offset failure has occurred in the reactor current sensor 730 provided in the phase C. Therefore, power supply may be continued by either of a two-phase driving and a three-phase driving using the phases A, B, and D other than the phase C.

Further, if an excess or a deficiency of electric energy is eliminated only while the phases A, C, and D are being driven, it can be determined that an offset failure has occurred in the reactor current sensor 730 provided in the phase B. Therefore, power supply may be continued by either of a two-phase driving and a three-phase driving using the phases A, C, and D other than the phase B.

Further, if an excess or a deficiency of electric energy is eliminated only while the phases B, C, and D are being driven, it can be determined that an offset failure has occurred in the reactor current sensor 730 provided in the phase A. Therefore, power supply may be continued by either of a two-phase driving and a three-phase driving using the phases B, C, and D other than the phase A.

As described above, when the FDC 51 is a four-phase converter, replacement patterns of the phases during four-phase driving include the above-described three patterns c1, c2, and c3.

Among them, the patterns c1 and c2 are preferable as a pattern for reducing the number of times of the replacement of the phases and enabling at least two phases to be normally driven.

Meanwhile, the pattern c3 is preferable as a pattern for specifying the phase in which an offset failure has occurred in the reactor current sensor 730.

According to this embodiment as described above, the host ECU 60 and the FDC_ECU 710 perform, while the output current of the FC 20 is kept constant, replacement of the phases driven by the FDC 51 when the host ECU 60 and the FDC_ECU 710 have detected an excess or a deficiency of electric energy of the electric load 59, and determines, when the excess or the deficiency of the electric energy of the electric load 59 is eliminated after the replacement of the phases, that an offset failure has occurred in the reactor current sensor 730 provided in the phase that has been driven before the replacement.

Accordingly, it is possible to detect an offset failure of the reactor current sensor 730, thereby preventing the control from being stopped due to a power shortage of the electric load 59 and excessive power supply to the electric load 59. Further, by using the host ECU 60 and the FDC 51 that is a multiphase converter, it is possible to detect an offset failure of the reactor current sensor 730 during operation (power supply), which is difficult for the FDC 51 alone to achieve.

Further, according to this embodiment, the host ECU 60 and the FDC_ECU 710 drive, when it is determined that an offset failure has occurred in the reactor current sensor 730, a phase other than the phase in which an offset failure has occurred in the reactor current sensor 730, and continue power supply to the electric load 59.

Accordingly, even if there is a phase in which an offset failure has occurred in the reactor current sensor 730 among the phases driven by FDC 51, it is possible to drive a phase other than the phase in which an offset failure has occurred in the reactor current sensor 730 and continue power supply to the electric load 59.

Further, according to this embodiment, the host ECU 60 and the FDC_ECU 710 perform replacement of the phases driven by the FDC 51 when they detect an excess or a deficiency of electric energy of the electric load 59 while N (N is an integer of 2 or greater) phases of the FDC 51 are driven, and drive, when it is determined that an offset failure has occurred in the reactor current sensor 730, M (M is an integer of 2 or greater) phases other than the phase in which a failure has occurred in the reactor current sensor 730 and continue power supply to the electric load 59.

Accordingly, even if there is a phase in which an offset failure has occurred in the reactor current sensor 730 among the phases driven by the FDC 51, it is possible to enable, before and after the replacement of the phases, two or more phases to be normally driven, which allows the fuel cell vehicle 10 to continuously perform a constant traveling.

Note that the present disclosure is not limited to the above-described embodiments, and can be appropriately changed without departing from the spirit of the present disclosure.

For example, in the present disclosure, the host ECU and the FDC_ECU include a processor such as a Central Processing Unit (CPU), and a memory, and any processing of the host ECU and the FDC_ECU can be achieved by the processor loading and executing a computer program stored in the memory.

In the above-described examples, the program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A fuel cell vehicle comprising:
   a fuel cell;
   a multiphase converter configured to control an output current of the fuel cell;
   a current sensor provided in each phase of the multiphase converter;
   an electric load configured to receive power supplied from the fuel cell; and
   a control unit, wherein the control unit:
   performs, when it detects an excess or a deficiency of electric energy of the electric load, a replacement of a phase driven by the multiphase converter with another phase while the output current of the fuel cell is kept constant; and
   determines, when the excess or the deficiency of the electric energy of the electric load is eliminated after the replacement of the phase, that an offset failure has occurred in the current sensor provided in the phase that has been driven before the replacement.

2. The fuel cell vehicle according to claim 1, wherein the control unit drives, when it is determined that an offset failure has occurred in the current sensor, a phase other than the phase in which an offset failure has occurred in the current sensor and continues power supply to the electric load.

3. The fuel cell vehicle according to claim 2, wherein the control unit:
   performs the replacement of the phase driven by the multiphase converter when it detects an excess or a deficiency of electric energy of the electric load while N (N is an integer of 2 or greater) phases of the multiphase converter are driven; and
   drives, when it is determined that an offset failure has occurred in the current sensor, M (M is an integer of 2 or greater) phases other than the phase in which a failure has occurred in the current sensor and continues power supply to the electric load.

4. The fuel cell vehicle according to claim 3, wherein the control unit performs, when it detects an excess or a deficiency of electric energy of the electric load while the N phases of the multiphase converter are being driven, the replacement of the phase driven by the multiphase converter a plurality of times.

5. A method for controlling a fuel cell vehicle comprising: a fuel cell; a multiphase converter configured to control an output current of the fuel cell; a current sensor provided in each phase of the multiphase converter; and an electric load configured to receive power supplied from the fuel cell, the method comprising:
   performing, when an excess or a deficiency of electric energy of the electric load is detected, a replacement of a phase driven by the multiphase converter with another phase while the output current of the fuel cell is kept constant, and
   determining, when the excess or the deficiency of the electric energy of the electric load is eliminated after the replacement of the phase, that an offset failure has occurred in the current sensor provided in the phase that has been driven before the replacement.

* * * * *